United States Patent
Kitagawa et al.

(10) Patent No.: US 10,168,520 B2
(45) Date of Patent: Jan. 1, 2019

(54) MICROSCOPE SYSTEM AND MICROSCOPY METHOD

(71) Applicant: OLYMPUS CORPORATION, Hachioji-shi, Tokyo (JP)

(72) Inventors: Hisao Kitagawa, Tokyo (JP); Yoshihiro Shimada, Kanagawa (JP); Kosuke Takagi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 121 days.

(21) Appl. No.: 15/161,997

(22) Filed: May 23, 2016

(65) Prior Publication Data

US 2016/0363748 A1 Dec. 15, 2016

(30) Foreign Application Priority Data

Jun. 15, 2015 (JP) .................................. 2015-120280

(51) Int. Cl.
- *G02B 21/00* (2006.01)
- *G02B 21/26* (2006.01)

(52) U.S. Cl.
CPC ......... *G02B 21/006* (2013.01); *G02B 21/008* (2013.01); *G02B 21/0028* (2013.01); *G02B 21/0076* (2013.01); *G02B 21/26* (2013.01)

(58) Field of Classification Search
None
See application file for complete search history.

(56) References Cited

U.S. PATENT DOCUMENTS

| 6,615,141 B1 * | 9/2003 | Sabry ................. G06K 9/00127 382/133 |
| 6,671,624 B1 | 12/2003 | Dunlay et al. |
| 8,824,767 B2 | 9/2014 | Takagi et al. |
| 2012/0033064 A1 * | 2/2012 | Yamada ............. G02B 21/0004 348/79 |

FOREIGN PATENT DOCUMENTS

| JP | 4011936 B2 | 11/2007 |
| JP | 4500138 B2 | 7/2010 |
| JP | 5355275 B2 | 11/2013 |
| JP | 5412149 B2 | 2/2014 |

* cited by examiner

*Primary Examiner* — Heather R Jones
(74) *Attorney, Agent, or Firm* — Holtz, Holtz & Volek PC

(57) ABSTRACT

Provided is a microscope system including a motor-driven stage on which is mounted a culture vessel containing one or more cell clusters, each including cells having a target molecule labeled with a fluorescent or luminescent chemical; a low-magnification-image acquiring unit that acquires low-magnification images of the cell clusters in the culture vessel mounted on the stage; a detecting unit that detects the position of each cell cluster in the culture vessel by analyzing the acquired low-magnification images; and a high-magnification-image acquiring unit that, after the detected position is aligned with the optical axis of an objective lens, acquires slice images of fluorescence or luminescence emitted from the cells forming the cell cluster at a higher magnification than the low-magnification-image acquiring unit at intervals along the optical axis while the stage and/or the lens is moved to change stepwise the distance between the lens and the cell cluster.

4 Claims, 9 Drawing Sheets

MICROSCOPE SYSTEM AND MICROSCOPY METHOD

CROSS REFERENCE TO RELATED APPLICATIONS

This application is based on Japanese Patent Application No. 2015-120280, the contents of which are incorporated herein by reference.

TECHNICAL FIELD

The present invention relates to microscope systems and microscopy methods.

BACKGROUND ART

There are known image cytometers, which read microscopic images of tissue cells as image data into a computer and generate data for individual cells by image analysis processing (see, for example, Patent Literature PTLs 1 and 2).

The cell data generated by image cytometers contains information about the positions of the cells in the tissue cell images and can be checked against the original images to clearly determine whether the data is about cells belonging to tumor tissue or about cells belonging to normal tissue.

CITATION LIST

Patent Literature

{PTL 1}
  Japanese Patent No. 4011936
{PTL 2}
  Japanese Patent No. 5412149

SUMMARY OF INVENTION

Solution to Problem

An aspect of the present invention is a microscope system including a motor-driven stage on which is mounted a culture vessel containing one or more cell clusters, each including a plurality of cells having a target molecule labeled with a fluorescent or luminescent chemical; a low-magnification-image acquiring unit that acquires low-magnification images of the cell clusters in the culture vessel mounted on the motor-driven stage; a cell-cluster-position detecting unit that detects the position of each cell cluster in the culture vessel by analyzing the low-magnification images acquired by the low-magnification-image acquiring unit; and a high-magnification-image acquiring unit that, after the position detected by the cell-cluster-position detecting unit is aligned with the optical axis of an objective lens, acquires a plurality of slice images of fluorescence or luminescence emitted from the cells forming the cell cluster at a higher magnification than the low-magnification-image acquiring unit at intervals along the optical axis while the motor-driven stage and/or the objective lens is moved to change stepwise the distance between the objective lens and the cell cluster.

DESCRIPTION OF EMBODIMENTS

A microscope system 1 and a microscopy method according to an embodiment of the present invention will be described below with reference to the drawings.

Figure 1:
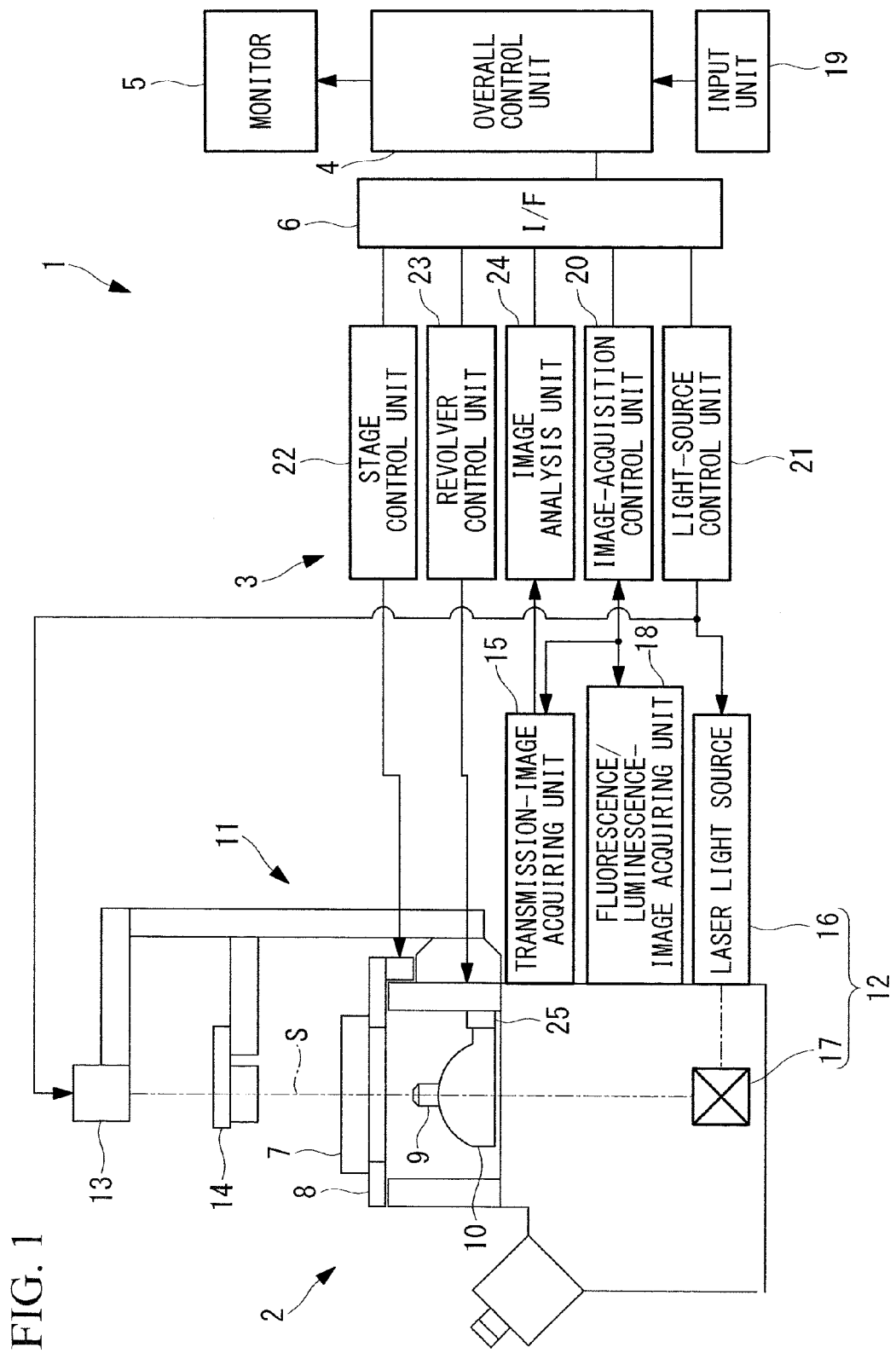
FIG. 1 is an overall block diagram illustrating a microscope system according to an embodiment of the present invention.

As shown in FIG. 1, the microscope system 1 according to this embodiment includes a microscope 2, a microscope control unit 3 that controls the microscope 2, an overall control unit 4 that sends commands to the microscope control unit 3 and that processes images acquired by the microscope 2, a monitor 5 that displays the images processed by the overall control unit 4, and an input unit 19 for user input to the overall control unit 4. As shown, reference sign 6 indicates an interface (I/F).

The microscope 2, which is an inverted microscope, includes a motor-driven stage 8 on which a multiwell plate (culture vessel) 7 containing cells A labeled with a fluorescent or luminescent chemical is mounted horizontally, a revolver 10 disposed below the motor-driven stage 8 and interchangeably holding a plurality of objective lenses 9 having different magnifications, a transmission examination optical system (low-magnification-image (first-magnification-image) acquiring unit) 11, and an epi-illumination examination optical system (high-magnification-image (second-magnification-image) acquiring unit) 12.

The motor-driven stage 8 can move the multiwell, plate 7 mounted thereon horizontally in the X and Y directions perpendicular to the optical axis S of the objective lens 9.

The revolver 10 has a Z-direction moving mechanism 25 that can move the objective lens 9 in the Z direction parallel to the optical axis S.

The transmission examination optical system 11 includes a transmission illumination light source 13 disposed above the motor-driven stage 8, a condenser lens 14 that concentrates illumination light emitted from the transmission illumination light source 13, and a transmission-image acquiring unit 15 that includes, an image-acquisition device such as a COD sensor and that acquires an image of light transmitted through the multiwell plate 7 and focused by the objective lens 9.

The epi-illumination examination optical system 12 includes a laser light source 16 that generates laser light, a scanner 17 that scans the laser light emitted from the laser light source 16 two-dimensionally in directions perpendicular the optical axis S of the objective lens 9, and a fluorescence/luminescence-image acquiring unit 18 that includes a photodetector configured to detect fluorescence or luminescence returning from the multiwell plate 7 and that generates a fluorescence/luminescence image.

The microscope control unit 3 includes an image-acquisition control unit 20 and a light-source control unit 21 that switch the operation between the transmission examination optical system 1 and the epi-illumination examination optical system 12, a stage control unit 22 that controls the positions of the multiwell plate 7 in the X and Y directions, and a revolver control unit 23 that actuates the revolver 10 to switch the magnification of the objective lens 9. The microscope control unit 3 also includes an image analysis unit (cell-cluster-position detecting unit) 24 that analyzes an image acquired by the transmission-image acquiring unit 15 to detect the positions of cell clusters B present in the image.

When a user inputs an instruction to start examination via the input unit 19, the overall control unit 4 sends a command to the revolver control unit 23 to actuate the revolver 10, and first, an objective lens 9 with low magnification is positioned on the examination optical axis S. The magnification of the objective lens 9 is selected to acquire an image showing an entire well 7a of the multiwell plate 7.

The overall control unit 4 also sends a command to the image-acquisition control unit 20 to activate the transmission-image acquiring unit 15 while activating the transmission illumination light source 13 to emit illumination light.

Figure 2:
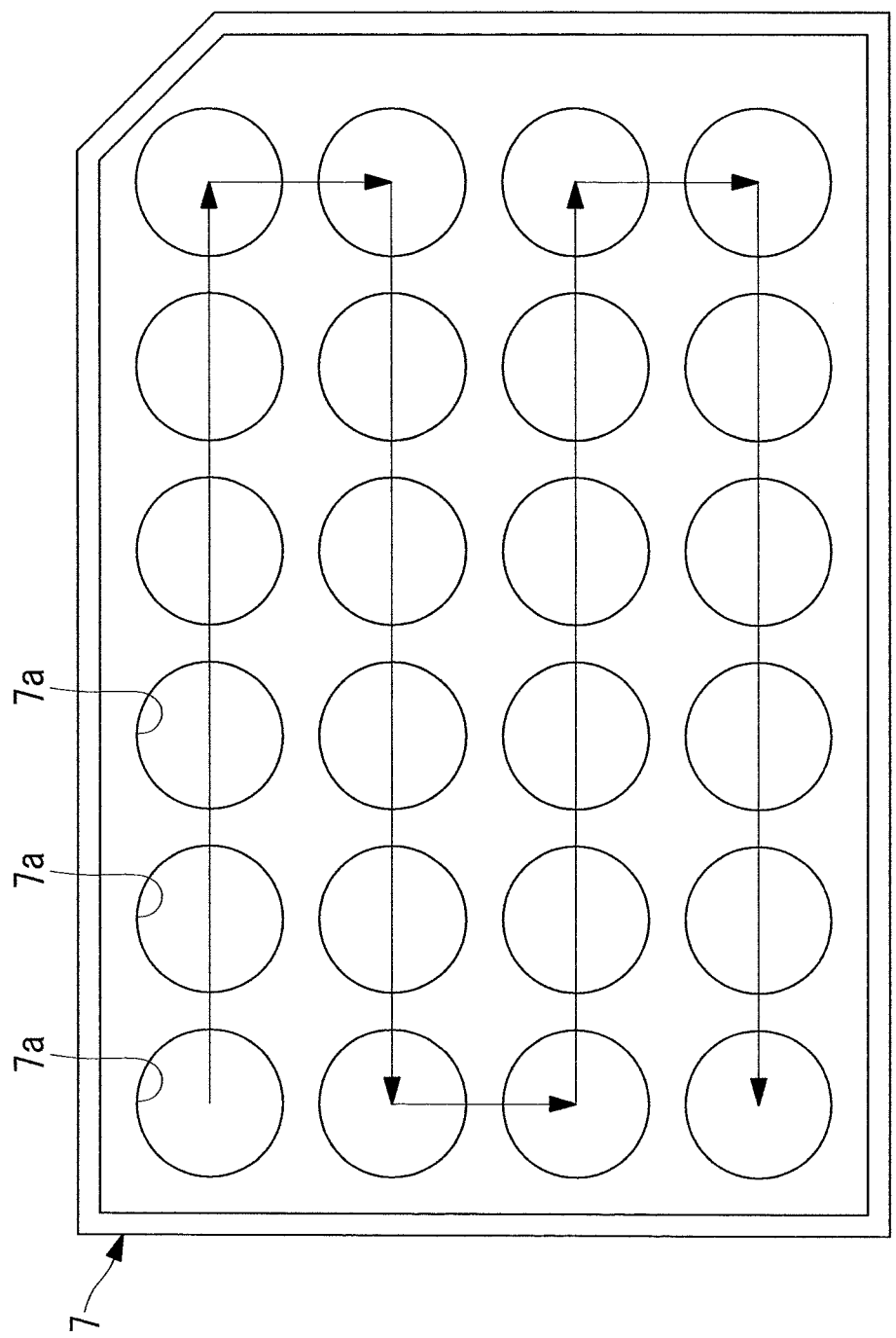
FIG. 2 is a plan view illustrating an example multiwell plate containing cells to be examined with the microscope system in FIG. 1.

The overall control unit 4 then actuates the motor-driven stage 8 in a preset moving pattern and, for example, as shown in FIG. 2, acquires transmission images by positioning the walls 7a of the multiwell plate 7 on the examination optical axis S one after another.

Figure 3:
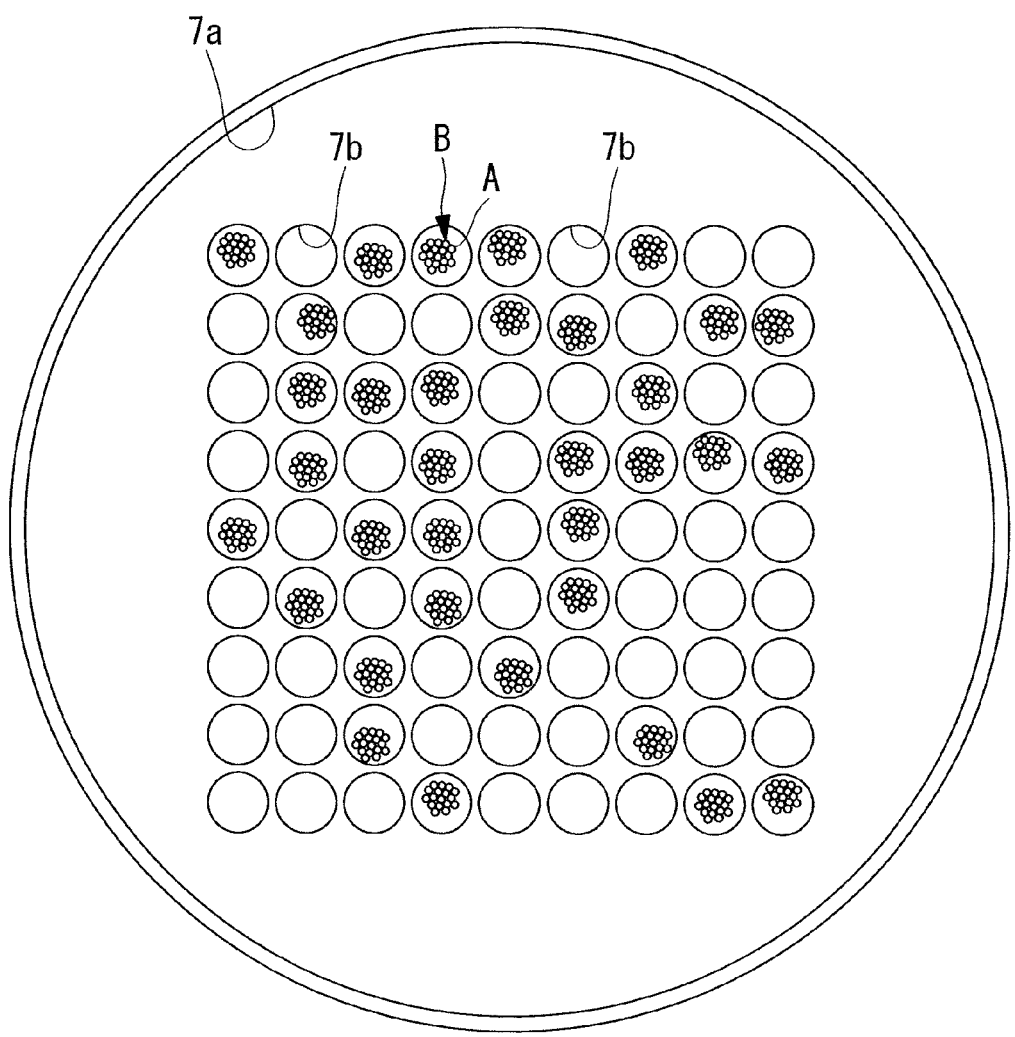
FIG. 3 is a plan view illustrating example cell clusters present in some of a plurality of holes provided in the wells of the multiwell plate in FIG. 2.
Figure 4:
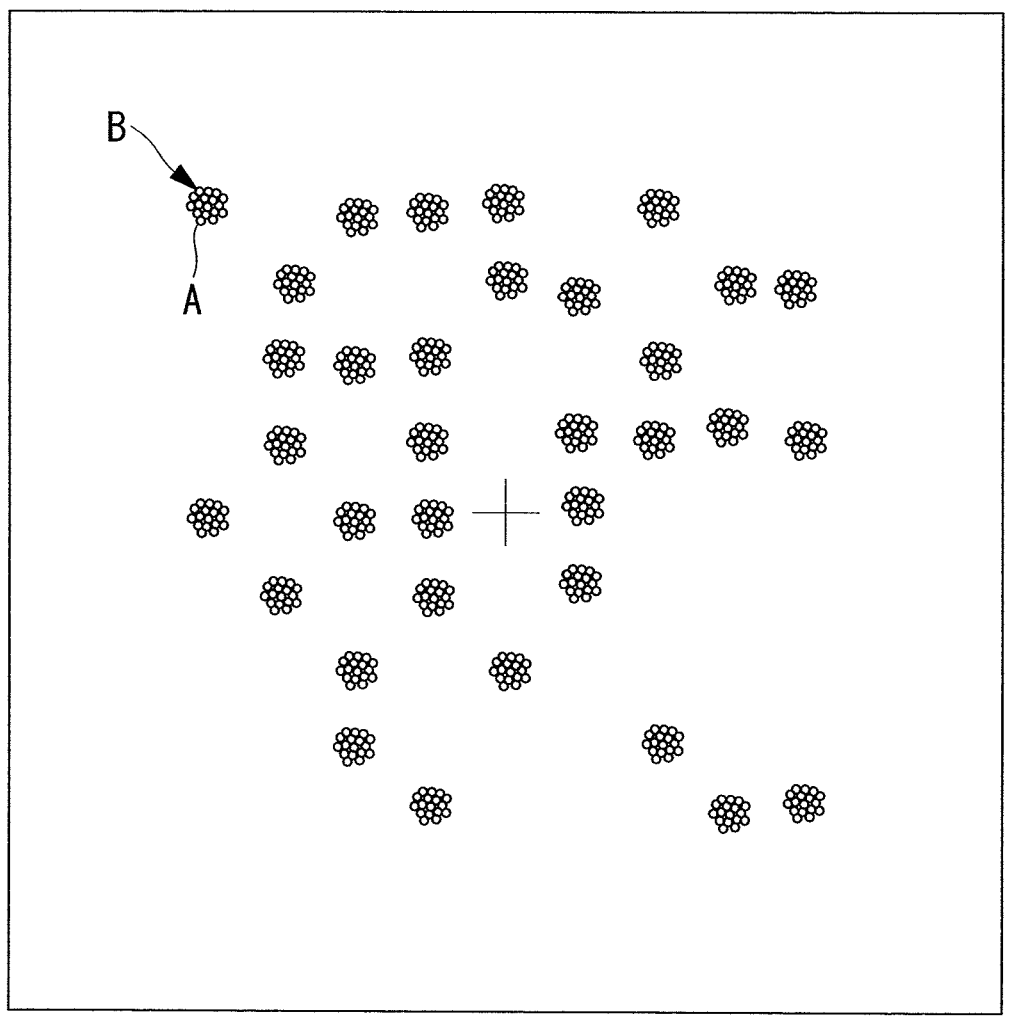
FIG. 4 illustrates an example transmission image obtained by acquiring an image of the entire well in FIG. 3.

For example, as shown in FIG. 3, each well 7a has numerous holes 7b formed as indentations in the bottom surface thereof, and cell clusters B are formed in some of the holes 7b. An example transmission image obtained by acquiring an image of the entire well 7a is shown in FIG. 4. The transmission image is acquired with the center thereof located on the center of the well 7a.

The transmission low-magnification images obtained by acquiring images of the wells 7a are sent to the image analysis unit 24, which recognizes the contours of the cell clusters B present in the transmission low-magnification images by image recognition processing. The image analysis unit 24 then calculates the position of each cell cluster B as the X and Y coordinates of the center of gravity of the cell cluster B from the recognized contours thereof and sends them to the overall control unit 4.

After the positions of the cell clusters B in all wells 7a are calculated and sent to the overall control unit 4, the overall control unit 4 sends a command to the revolver control unit 23 to position an objective lens 9 with a higher magnification on the examination optical axis S and sends a command to the light-source control unit 21 to stop the transmission illumination light source 13 and activate the laser light source 16.

The overall control unit 4 then sends a command to the stage control unit 22 to actuate the motor-driven stage 8 so that the position of each cell cluster B in the wells 7a aligns with the examination optical axis S. The overall control unit 4 also sends a command to the revolver control unit 23 to bring the focal position of the objective lens near either end of the cell cluster B in the Z direction.

In this way, the laser light emitted from the laser light source 16 in the epi-illumination examination optical system 12 is scanned two-dimensionally in directions perpendicular to the optical axis S of the objective lens 9 by the scanner 17, and fluorescence or luminescence returning from the multiwell plate 7 is detected by the photodetector of the fluorescence/luminescence-image acquiring unit 18 to acquire a slice image of the fluorescence or luminescence. After the acquisition of the slice image, the Z-direction moving mechanism 25 is actuated to slightly move the objective lens 9 in the Z direction, and a slice image is acquired at that position. This process is repeated.

A microscopy method using the thus-configured microscope system 1 according to this embodiment will be described below.

Figure 5:
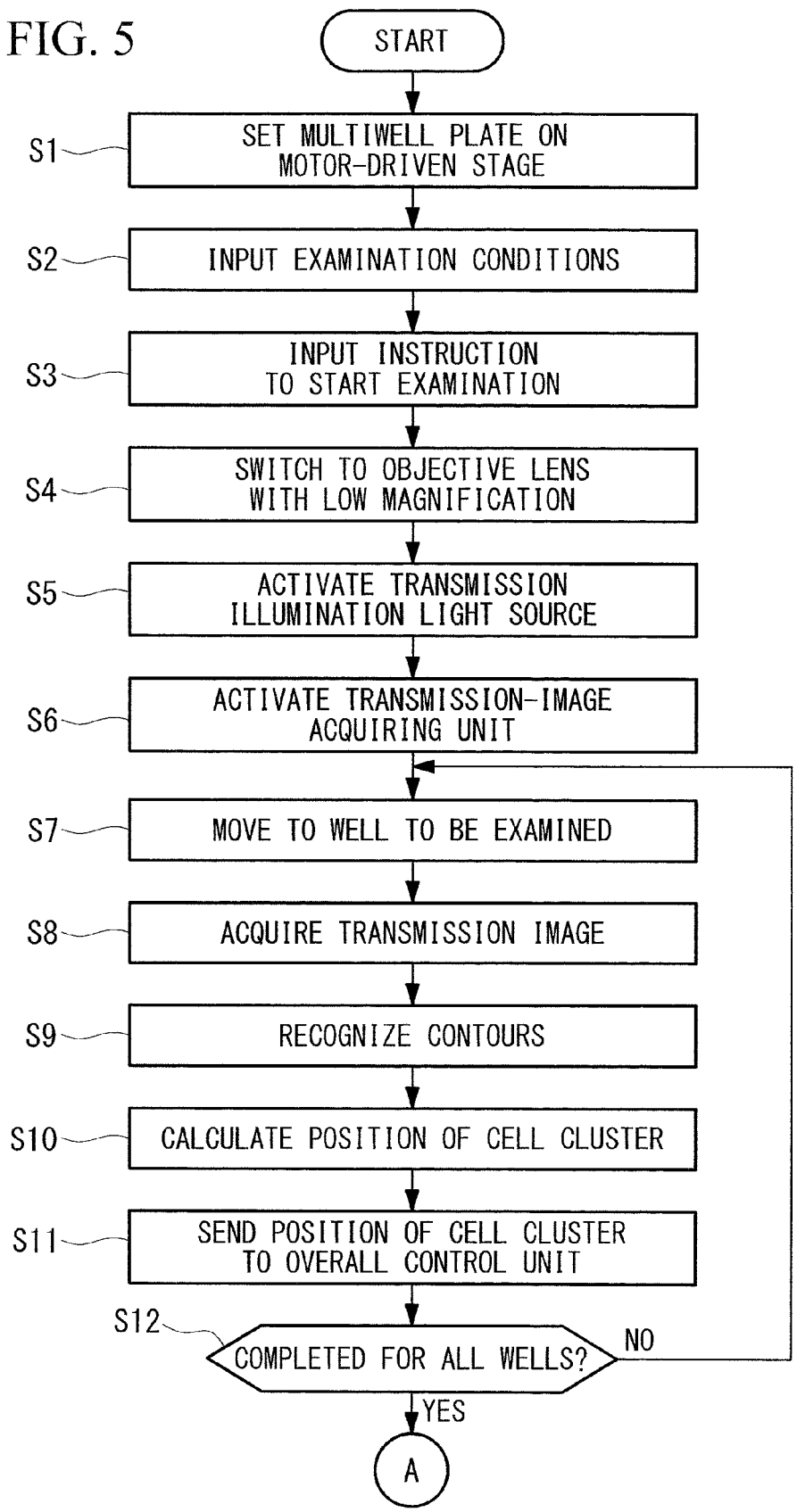
FIG. 5 is a flowchart illustrating a microscopy method using the microscope system in FIG. 1.

To perform the examination of the cells A contained in the multiwell plate 7 using the microscope system 1 according to this embodiment, as shown in FIG. 5, the multiwell plate 7 containing the cells A, which are labeled with a fluorescent or luminescent chemical, is set on the motor-driven stage 8 (step S1). The user inputs examination conditions via the input unit 19 (step S2).

Examples of examination conditions that can be input include the type of multiwell plate 7, the examination magnification, the amount of feed of the Z-direction moving mechanism 25, and the wavelength of the illumination light.

When the user inputs an instruction to start examination via the input unit 19 (step S3), the transmission examination optical system 11 is first selected, and the overall control unit 4 sends commands to the image-acquisition control unit 20, the light-source control unit 21, the stage control unit 22, and the revolver control unit 23.

The revolver control unit 23 receives a command to select an objective lens 9 with low magnification and switches the objective lens 9 to an objective lens with low magnification (step S4). The revolver control unit 23 also controls the Z-direction moving mechanism 25 to set the focal plane of the objective lens 9 at the average central position of the cell clusters B in the Z direction.

The light-source control unit 21 activates the transmission illumination light source 13 (step S5), and the image-acquisition control unit 20 activates the transmission-image acquiring unit 15 (step S6). The stage control unit 22 controls the motor-driven stage 8 to move the multiwell plate 7 in the X and Y directions so that the center of the well 7a to be examined aligns with the examination optical axis S (step S7).

The illumination light emitted from the transmission illumination light source 13 is concentrated by the condenser lens 14, is transmitted through the multiwell plate 7, and is focused by the objective lens 9, and an image is acquired by the transmission-image acquiring unit 15. In this way, a transmission image of the entire well 7a positioned on the examination optical axis S is acquired (low-magnification-image acquiring step S8). The acquired transmission image is sent to the image analysis unit 24, which recognizes the contours of each cell cluster B (step S9) and calculates the X and Y coordinates of the center of gravity of the recognized contours of the cell cluster B (position-detecting step S10). The calculated X and Y coordinates of each cell cluster B are sent the overall control unit 4 (step S11), and step S7 and the subsequent steps are repeated on the next well 7a unless all wells 7a have been processed (step S12).

If the positions of the cell clusters B present in all wells 7a have been detected, the overall control unit 4 sends, to the image-acquisition control unit 20, the light-source control unit 21, the stage control unit 22, and the revolver control unit 23, a command to switch to the epi-illumination examination optical system 12.

Figure 6:
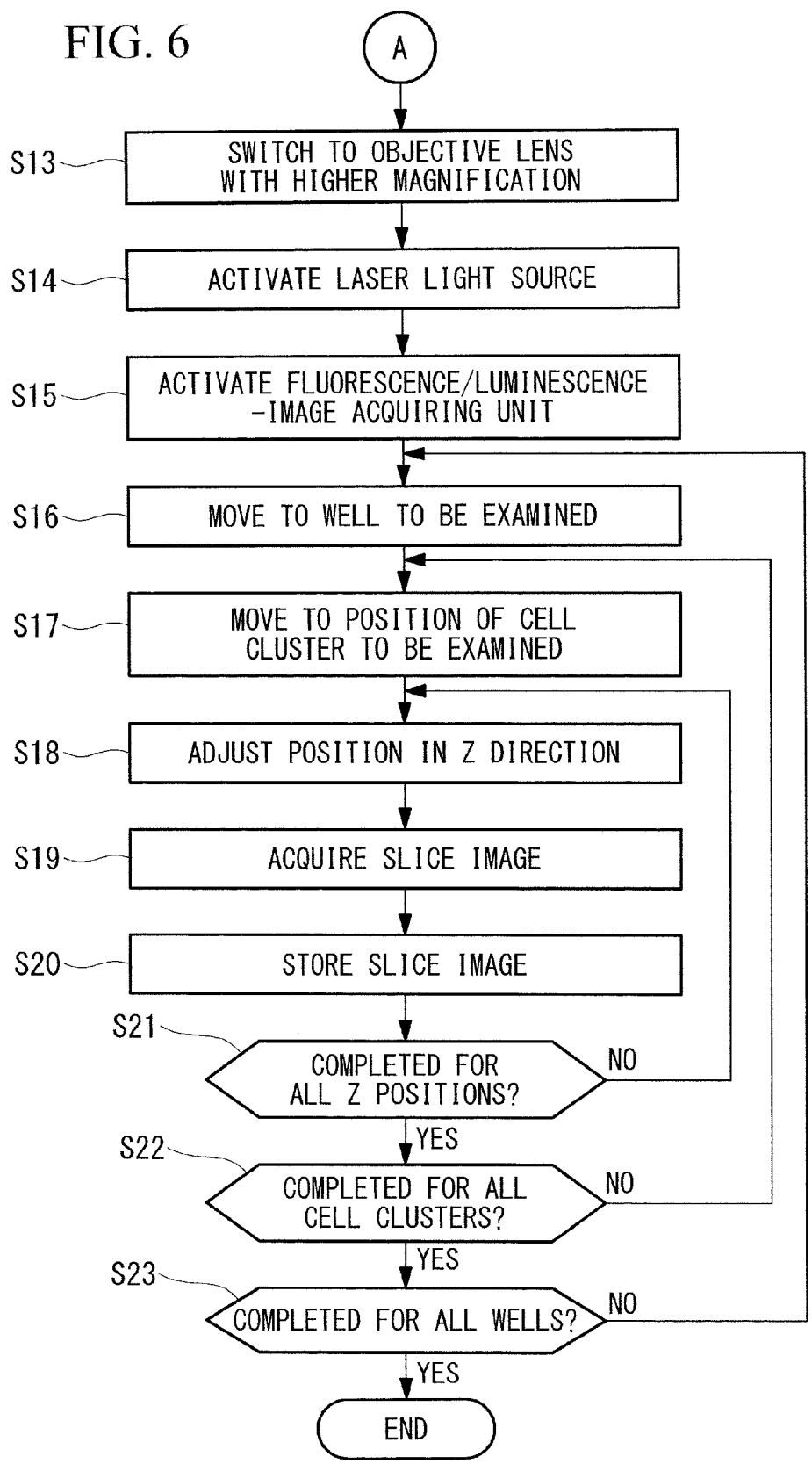
FIG. 6 is a flowchart illustrating the steps following the steps in FIG. 5.

As shown in FIG. 6, a command to select an objective lens 9 with a higher magnification is first sent to the revolver control unit 23, and the objective lens 9 is switched to an objective lens with a higher magnification (step S13). The revolver control unit 23 also controls the Z-direction moving mechanism 25 to set the focal plane of the objective lens 9 near ends of the cell clusters B in the Z direction.

The light-source control unit 21 activates the laser light source 16 (step S14), and the image-acquisition control unit 20 activates the fluorescence/luminescence-image acquiring unit 18 (step S15). The stage control unit 22 controls the motor-driven stage 8 to move the multiwell plate 7 so that the well 7a to be examined aligns with the examination optical axis S (step S16) and to move the multiwell plate 7 in the X and Y directions so that the cell cluster B to be examined in the well 7a to be examined aligns with the examination optical axis S (step S17).

Figure 7:
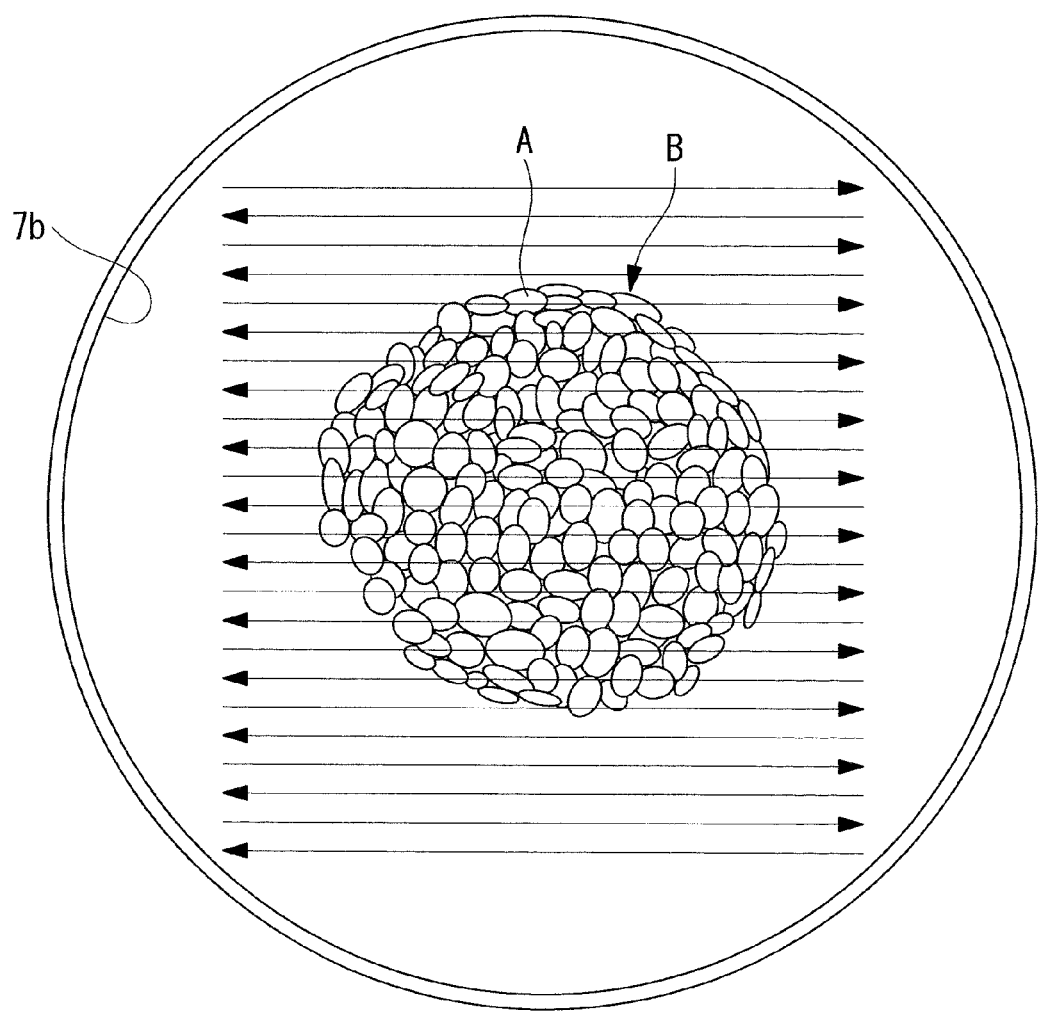
FIG. 7 is a plan view illustrating a cell cluster in a hole and the scan path thereof in the slice-image acquiring step in FIG. 6.

The Z-direction moving mechanism 25 is then actuated to adjust the position of the focal plane of the laser light in the Z direction (step S18) and, as shown in FIG. 7, the laser light is scanned two-dimensionally in the X and Y directions by the scanner 17 at the set position of the cell cluster B in the Z direction. The arrows in the figure indicate the path of the scanned laser light. The fluorescence or luminescence emitted from each scanned position is focused by the objective lens 9, is detected by the photodetector of the fluorescence/luminescence-image acquiring unit 18, and is stored in association with the scanned position to acquire a slice image of the cell cluster B (high-magnification-image acquiring step S19). The acquired slice image is stored in association with the Z position (step S20).

Figure 8:
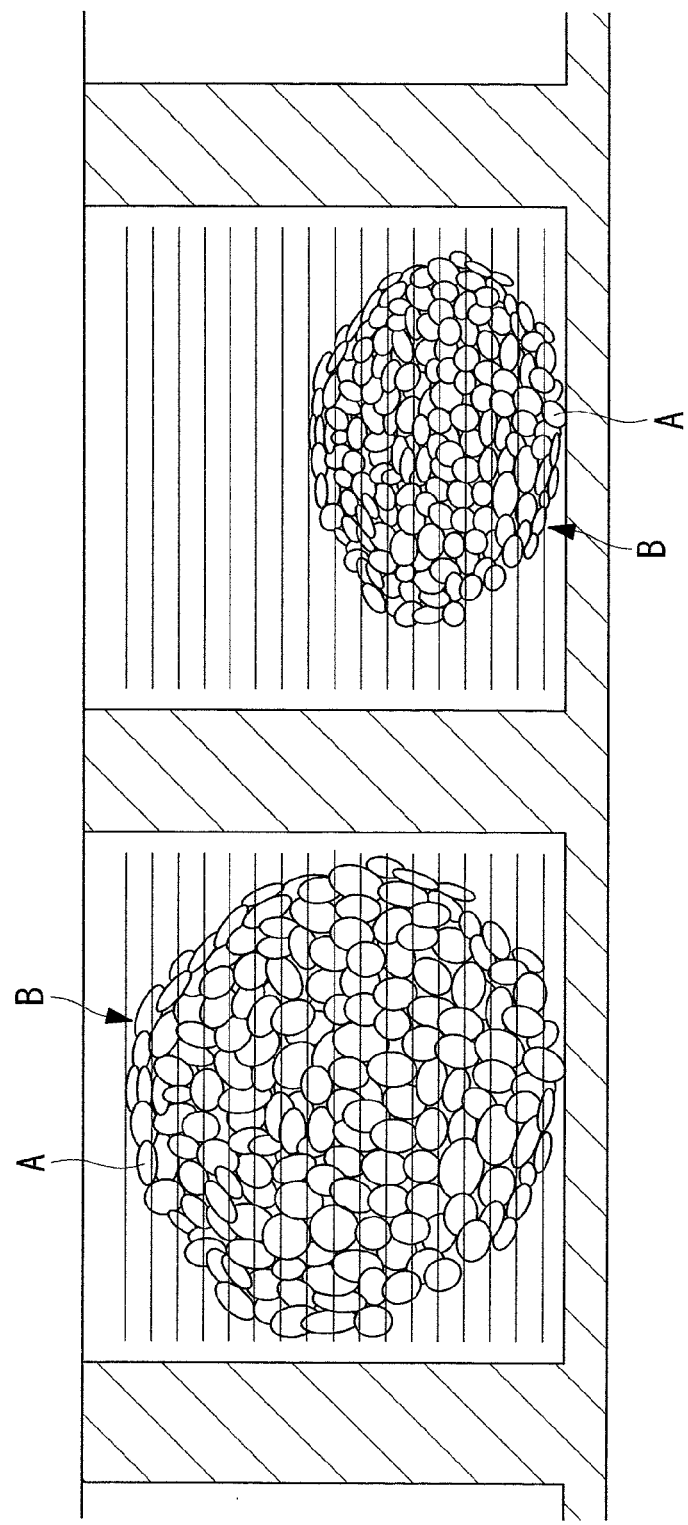
FIG. 8 is a longitudinal sectional view illustrating a cell cluster in a hole and the planes where sliced images are acquired in the slice-image acquiring step in FIG. 6.

It is determined whether the Z position is at the other end of the cell cluster B (whether slice images have been acquired at all positions in the Z direction) (step S21). If the other end is not reached, step S18, in which the direction moving mechanism 25 is actuated to slightly move the focal plane of the objective lens 9 by a predetermined amount of feed, and the subsequent steps are repeated. In this way, as shown in FIG. 8, sliced images of one cell cluster B in the X and Y directions are acquired at a plurality of positions in the Z direction, which allows the cell cluster B to be assessed three-dimensionally. The acquired images are sent to and stored in the overall control unit 4 and are displayed on the monitor 5.

It is determined whether all slice images of all cell clusters B in the same well 7a have been acquired (step S22). If not all slice images of all cell clusters B have been acquired, step S17 and the subsequent steps are repeated. If it is determined that all slice images of all cell clusters B in the same well 7a have been acquired, it is determined whether images have been acquired in all wells 7a of the multiwell plate 7 (step S23). If images have not been acquired in all wells 7a, step S16 and the subsequent steps are repeated.

Thus, the microscope system 1 and microscopy method according to this embodiment allow the acquisition of three-dimensional high-magnification images of three-dimensionally cultured cell clusters B, which provides the advantage of allowing efficient cytometry under conditions closer to in vivo conditions than those of monolayer culture cells. The microscopy method according to this embodiment also requires the optical system to be switched only once since the positions of the cell clusters B in all wells 7a are calculated with the transmission examination optical system 11 before slice images are acquired with the epi-illumination examination optical system 12, which allows efficient acquisition of the cell clusters B.

Although the microscope system 1 according to this embodiment calculates the positions of the cell clusters B based on the low-magnification images acquired with the transmission examination optical system 11, the epi-illumination examination optical system 12 may instead be used alone to calculate the positions of the cell clusters B without using the transmission examination optical system 11.

Figure 9:
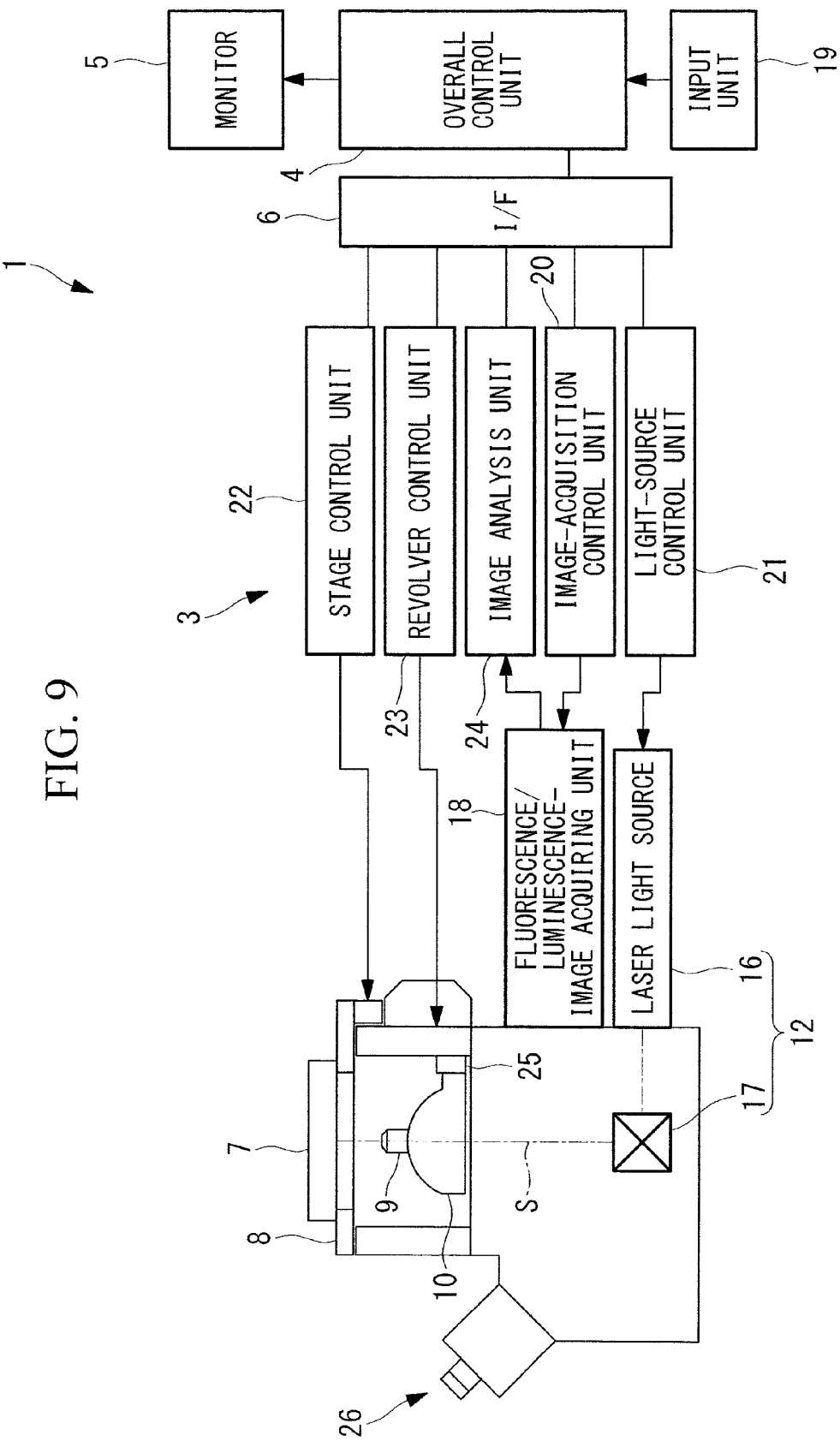
FIG. 9 is an overall block diagram illustrating a modification of the microscope system in FIG. 1.

That is, examination may be performed without using the transmission examination optical system 11 of the microscope system 1 shown in FIG. 1 or, as shown in FIG. 9, examination may be performed using a microscope 26 including no transmission examination optical system 11.

In this case, low-magnification images of the entire wells 7a may be acquired with the fluorescence/luminescence-image acquiring unit 18, and the positions of the cell clusters B may be calculated based on the cells A that emit fluorescence or luminescence in the low-magnification images.

That is, if not all cells A that form the cell clusters emit fluorescence or luminescence, the centers of gravity of the cell clusters B may be estimated based on a plurality of neighboring cells A that emit fluorescence or luminescence within a predetermined area. This provides the advantage of allowing the cell clusters B to be assessed three-dimensionally using the epi-illumination examination optical system 12 alone without switching between the transmission examination optical system 11 and the epi-illumination examination, optical system 12.

The fluorescence/luminescence-image acquiring unit 18 may detect the maximum diameter of each cell cluster B based on the low-magnification transmission or fluorescence images acquired in the preceding process and may set the magnification of the high-magnification objective lens 9 to achieve the optimum scanning range of the laser light. This provides the advantage of acquiring high-magnification images enlarged to an appropriate size using the objective lens 9 having the magnification set based on the maximum diameter of each cell cluster B, which allows precise examination.

The above-described embodiment leads to the following inventions.

An aspect of the present invention is a microscope system including a motor-driven stage on which is mounted a culture vessel containing one or more cell clusters, each including a plurality of cells having a target molecule labeled with a fluorescent or luminescent chemical; a low-magnification-image acquiring unit that acquires low-magnification images of the cell clusters in the culture vessel mounted on the motor-driven stage; a cell-cluster-position detecting unit that detects the position of each cell cluster in the culture vessel by analyzing the low-magnification images acquired by the low-magnification-image acquiring unit; and a high-magnification-image acquiring unit that, after the position detected by the cell-cluster-position detecting unit is aligned with the optical axis of an objective lens, acquires a plurality of slice images of fluorescence or luminescence emitted from the cells forming the cell cluster at a higher magnification than the low-magnification-image acquiring unit at intervals along the optical axis while the motor-driven stage and/or the objective lens is moved to change stepwise the distance between the objective lens and the cell cluster.

According to this embodiment, a vessel containing one or more cell clusters is mounted on the motor-driven stage, and the low-magnification-image acquiring unit is activated to acquire low-magnification images of the cell clusters in the culture vessel. The cell-cluster-position detecting unit then detects the position of each cell cluster by analyzing the low-magnification images. The motor-driven stage is then moved to align the detected position of the cell cluster with the optical axis of the objective lens, and the high-magnification-image acquiring unit acquires a high-magnification slice image of the cell cluster. The high-magnification-image acquiring unit acquires a plurality of slice images of fluorescence or luminescence emitted from the cells forming the cell cluster at intervals along the optical axis while the motor-driven stage or the objective lens is moved to change stepwise the distance between the objective lens and the cell cluster. This allows the acquisition of three-dimensional high-magnification images of cell clusters and thus allows efficient cytometry under conditions closer to in vivo conditions than those of monolayer culture cells.

In the above aspect, the low-magnification-image acquiring unit may acquire transmission low-magnification images of the cell clusters, and the cell-cluster-position detecting unit may detect the position of each cell cluster present in the transmission low-magnification images based on the contours of the cell cluster.

According to this aspect, transmission illumination light is incident on the side of the culture vessel facing away the objective lens, and the low-magnification-image acquiring unit is activated to acquire transmission low-magnification images of light transmitted through the cell clusters in the culture vessel and focused by the objective lens. The resulting transmission, low-magnification images contain the contours of the cell clusters, which can be extracted and used to detect the position of each cell cluster in a simple manner, for example, as a representative position such as the center of gravity.

In the above aspect, the low-magnification-image acquiring unit may acquire low-magnification images of fluorescence or luminescence emitted from the cells forming the cell clusters, and the cell-cluster-position detecting unit may estimate the position of each cell cluster based on neighboring cells present in the low-magnification images of fluorescence or luminescence.

According to this aspect, the low-magnification-image acquiring unit is activated to acquire low-magnification images of fluorescence or luminescence emitted from the cells forming the cell clusters. Although not all cells forming the cell clusters emit fluorescence or luminescence, neighboring cells that emit fluorescence or luminescence are likely to belong to the same cell cluster; therefore, the overall contours of the cell clusters can be estimated based on neighboring cells present in the low-magnification images, which allows the position of each cell cluster to be estimated in a simple manner.

In the above aspect, the high-magnification-image acquiring unit may detect the maximum diameter of each cell cluster present in the low-magnification images acquired by the low-magnification-image acquiring unit and may set the magnification of the objective lens used based on the detected maximum diameter.

According to this aspect, high-magnification images enlarged to an appropriate size can be acquired using the objective lens having the magnification set based on the maximum diameter of each cell cluster, which allows precise examination.

Another aspect of the present invention is a microscopy method including a low-magnification-image acquiring step of acquiring low-magnification images of one or more cell clusters contained in a culture vessel, each including a plurality of cells having a target molecule labeled with a fluorescent or luminescent chemical; a position-detecting step of detecting the position of each cell cluster in the culture vessel by analyzing the low-magnification images acquired in the low-magnification-image acquiring step; and a high-magnification-image acquiring step of, after aligning the position detected in the position-detecting step with the optical axis of an objective lens, acquiring a plurality slice images of fluorescence or luminescence emitted from the cell cluster at a higher magnification than in the low-magnification-image acquiring step while changing stepwise the distance between the objective lens and the cell cluster.

REFERENCE SIGNS LIST 1 microscope system
7 multiwell plate (culture vessel)
8 motor-driven stage
9 objective lens
11 transmission examination optical system (low-magnification-image acquiring unit)
12 epi-illumination examination optical system (high-magnification-image acquiring unit)
24 image analysis unit (cell-cluster-position detecting unit)
S8 low-magnification-image acquiring step
S10 position-detecting step
S19 high-magnification-image acquiring step
A cell
B cell cluster

The invention claimed is:

1. A microscope system comprising:
a motor-driven stage on which is mounted a culture vessel containing one or more cell clusters, each cell cluster comprising a plurality of cells having a target molecule labeled with a fluorescent or luminescent chemical;
a low-magnification-image acquiring unit that acquires low-magnification images of the cell clusters in the culture vessel mounted on the motor-driven stage;
a cell-cluster-position detecting unit that detects the position of each cell cluster in the culture vessel by analyzing the low-magnification images acquired by the low-magnification-image acquiring unit; and
a high-magnification-image acquiring unit that, for each cell cluster, after the position of the cell cluster detected by the cell-cluster-position detecting unit is aligned with an optical axis of an objective lens, acquires a plurality of slice images of fluorescence or luminescence emitted from the cells forming the cell cluster, the plurality of slice images being acquired with a magnification of the objective lens being set at a higher magnification than a magnification of the objective lens used to acquire the low-magnification images, and the plurality of slice images being acquired at intervals along the optical axis while at least one of the motor-driven stage and the objective lens is moved so as to change, in a stepwise manner, a distance between the objective lens and the cell cluster to be different when acquiring each of the plurality of slice images,
wherein the high-magnification-image acquiring unit detects the maximum diameter of each cell cluster present in the low-magnification images acquired by the low-magnification-image acquiring unit, and sets the magnification of the objective lens used to acquire the plurality of slice images of each cell cluster based on the detected maximum diameter thereof.

2. The microscope system according to claim 1, wherein:
the low-magnification-image acquiring unit acquires transmission low-magnification images of the cell clusters; and
the cell-cluster-position detecting unit detects the position of each cell cluster present in the transmission low-magnification images based on contours of the cell cluster.

3. The microscope system according to claim 1, wherein:
the low-magnification-image acquiring unit acquires low-magnification images of fluorescence or luminescence emitted from the cells forming the cell clusters; and
the cell-cluster-position detecting unit estimates the position of each cell cluster based on neighboring cells present in the low-magnification images of fluorescence or luminescence.

4. A microscopy method comprising:
a low-magnification-image acquiring step of acquiring low-magnification images of one or more cell clusters contained in a culture vessel, each cell cluster comprising a plurality of cells having a target molecule labeled with a fluorescent or luminescent chemical;
a position-detecting step of detecting the position of each cell cluster in the culture vessel by analyzing the low-magnification images acquired in the low-magnification-image acquiring step; and
a high-magnification-image acquiring step of, for each cell cluster, after aligning the position of the cell cluster detected in the position-detecting step with an optical axis of an objective lens, acquiring a plurality of slice images of fluorescence or luminescence emitted from the cell cluster, the plurality of slice images being acquired with a magnification of the objective lens being set at a higher magnification than a magnification of the objective lens used to acquire the low-magnification images, and the plurality of slice images being acquired at intervals along the optical axis while changing, in a stepwise manner, a distance between the objective lens and the cell cluster to be different when acquiring each of the plurality of slice images,
wherein the high-magnification-image acquiring step comprises detecting the maximum diameter of each cell cluster present in the low-magnification images acquired in the low-magnification-image acquiring step, and setting the magnification of the objective lens used to acquire the plurality of slice images of each cell cluster based on the detected maximum diameter thereof.

* * * * *